(12) United States Patent
Tan et al.

(10) Patent No.: US 9,660,984 B2
(45) Date of Patent: May 23, 2017

(54) METHOD OF AUTOMATICALLY UNLOCKING AN ELECTRONIC DEVICE VIA A WEARABLE DEVICE

(71) Applicant: Dell Products, L.P., Round Rock, TX (US)

(72) Inventors: Geroncio Tan, Austin, TX (US); Fernando L. Guerrero, Austin, TX (US); Danilo O. Tan, Austin, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 208 days.

(21) Appl. No.: 14/675,749

(22) Filed: Apr. 1, 2015

(65) Prior Publication Data

US 2016/0294817 A1 Oct. 6, 2016

(51) Int. Cl.
| | |
|---|---|
| H04L 29/06 | (2006.01) |
| H04W 12/06 | (2009.01) |
| G06Q 20/40 | (2012.01) |
| G06Q 20/32 | (2012.01) |
| G06F 21/35 | (2013.01) |
| G06Q 50/28 | (2012.01) |
| G06Q 20/12 | (2012.01) |
| G06Q 20/38 | (2012.01) |

(52) U.S. Cl.
CPC .......... *H04L 63/0838* (2013.01); *G06F 21/35* (2013.01); *G06Q 20/12* (2013.01); *G06Q 20/327* (2013.01); *G06Q 20/385* (2013.01); *G06Q 20/405* (2013.01); *G06Q 50/28* (2013.01); *H04L 63/0861* (2013.01); *H04W 12/06* (2013.01)

(58) Field of Classification Search
CPC ..... H04L 63/0838; H04W 12/06; G06F 21/35
See application file for complete search history.

(56) References Cited

U.S. PATENT DOCUMENTS

| | | | |
|---|---|---|---|
| 8,869,263 B2 | 10/2014 | Pasquero et al. | |
| 2015/0046828 A1* | 2/2015 | Desai ...................... | G06F 1/163 715/739 |
| 2016/0086176 A1* | 3/2016 | Silva Pinto .......... | G06Q 20/401 705/44 |

\* cited by examiner

*Primary Examiner* — Dao Ho
(74) *Attorney, Agent, or Firm* — Norton Rose Fulbright US LLP

(57) ABSTRACT

Methods and systems for automatically unlocking an electronic device via a wearable device may include a first device authenticating a user of a wearable device in response to the user closing a clasp of the wearable device and entering a personal authentication password on the first device; a second device requesting a rolling one-time password (OTP) via a wireless connection to the wearable device in response to the second device detecting that the wearable device is within a predefined physical range, and a user pressing an input key; unlocking the second device in response to the second device receiving the OTP from the wearable device; monitoring a status of the clasp, wherein the status comprises a closed or an open state; and deleting OTP or password key information from the wearable device in response to the processor of the wearable device detecting that the clasp is in an open state.

17 Claims, 7 Drawing Sheets

METHOD OF AUTOMATICALLY UNLOCKING AN ELECTRONIC DEVICE VIA A WEARABLE DEVICE

FIELD

This disclosure relates generally to computer systems, and more specifically, to a method of automatically unlocking an electronic device via a wearable device.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems utilize various security measures to protect data by only granting access to one or more authorized users. The strength of a password-based security system typically depends on the length and complexity of the password, with longer and more complex passwords being more secure than shorter and simpler passwords. However lengthy passwords that contain special characters can be hard for users to remember. Similarly, long complex passwords require more typing and are thus inefficient to enter repeatedly for users who need to access the same system or application multiple times per day. Consequently users often choose less secure passwords out of convenience, thereby diminishing the security level of the systems and applications being accessed.

Conventional security systems that utilize wearable devices for user authentication rely on biometric sensors, such as heart rate monitors, embedded within the wearable device. Heart rate monitors and other biometric modules have a high Bill of Materials (BOM) cost and typically consume relatively high amounts of electrical power due to their complex circuitry and elaborate software algorithms. As a result, wearable devices that include heart rate monitors are expensive. Furthermore, conventional wearable security devices need to be removed from the user frequently in order to be recharged. Frequent removal adds an inconvenience factor to the user experience that in most cases will result in inhibiting widespread user adoption of such devices.

SUMMARY

Methods and systems for automatically unlocking an electronic device via a wearable device are described. In an embodiment, a method may include authenticating, with a first device, a user of a wearable device in response to the user closing a clasp of the wearable device and entering a personal authentication password on the first device. The method may also include requesting, with a wireless unit of a second device, a rolling one-time password (OTP) from a series of passwords via a wireless connection to the wearable device in response to the second device detecting that the wearable device is within a predefined physical range of the second device, and a user of the wearable device pressing an input key of the second device. Additionally, the method may include unlocking, with a processor of the second device, the second device in response to the second device receiving the rolling OTP from the wearable device. The method may also include monitoring, with a processor of the wearable device, a status of the clasp, wherein the status comprises a closed state or an open state. In an embodiment, the method may also include deleting, with the processor of the wearable device, OTP or password key information from the wearable device in response to the processor of the wearable device detecting that the clasp is in an open state.

In a further embodiment, the first device and the second device includes a plurality of information handling systems. Additionally, authenticating the user further may include the first device reading a fingerprint of the user. In some embodiments, the wireless connection also includes a Bluetooth Low Energy (LE) connection.

The method may include locking, with a processor of the second device, the second device in response to the second device detecting that the wearable device is outside the predefined physical range. The predefined physical range may include an inner zone. An outer zone may include a second physical range including distances greater than the inner zone and less than a maximum transmission distance of a wireless unit of the wearable device. The processor of the second device may be configured to calculate a position of the wearable device relative to the inner zone and the outer zone in response to the processor of the second device measuring a wireless signal strength of a signal received from the wearable device.

The method may also include authorizing a web page login on a browser of the second device in response to: the second device detecting that the wearable device is within a predefined physical range of the second device; and a user of the wearable device navigating to the web page on the browser. Additionally, the method may include authorizing an online shopping payment in response to a user of the wearable device making a purchase with the browser.

A system for automatically unlocking an electronic device via a wearable device may include a first device configured to authenticate a user of a wearable device in response to the user closing a clasp of the wearable device and entering a personal authentication password on the first device. A wireless unit of a second device may be configured to request a rolling one-time password (OTP) from a series of passwords via a wireless connection to the wearable device in response to: the second device detecting that the wearable device is within a predefined physical range of the second device; and a user of the wearable device pressing an input key of the second device. A processor of the second device may be configured to unlock the second device in response to the second device receiving the rolling OTP from the wearable device. Additionally, the system may include a processor of the wearable device configured to: monitor a status of the clasp, wherein the status comprises a closed state or an open state; and deactivate the wearable device in response to the processor of the wearable device detecting that the clasp is in an open state.

An apparatus for automatically unlocking an electronic device via a wearable device may include a first device configured to authenticate a user of a wearable device in response to the user closing a clasp of the wearable device and entering a personal authentication password on the first device. The apparatus may also include a wireless unit of a second device configured to request a rolling one-time password (OTP) from a series of passwords via a wireless connection to the wearable device in response to: the second device detecting that the wearable device is within a pre-defined physical range of the second device; and a user of the wearable device pressing an input key of the second device. Additionally, the apparatus may include a processor of the second device configured to unlock the second device in response to the second device receiving the rolling OTP from the wearable device; and a processor of the wearable device configured to: monitor a status of the clasp, wherein the status comprises a closed state or an open state; and deactivate the wearable device in response to the processor of the wearable device detecting that the clasp is in an open state.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
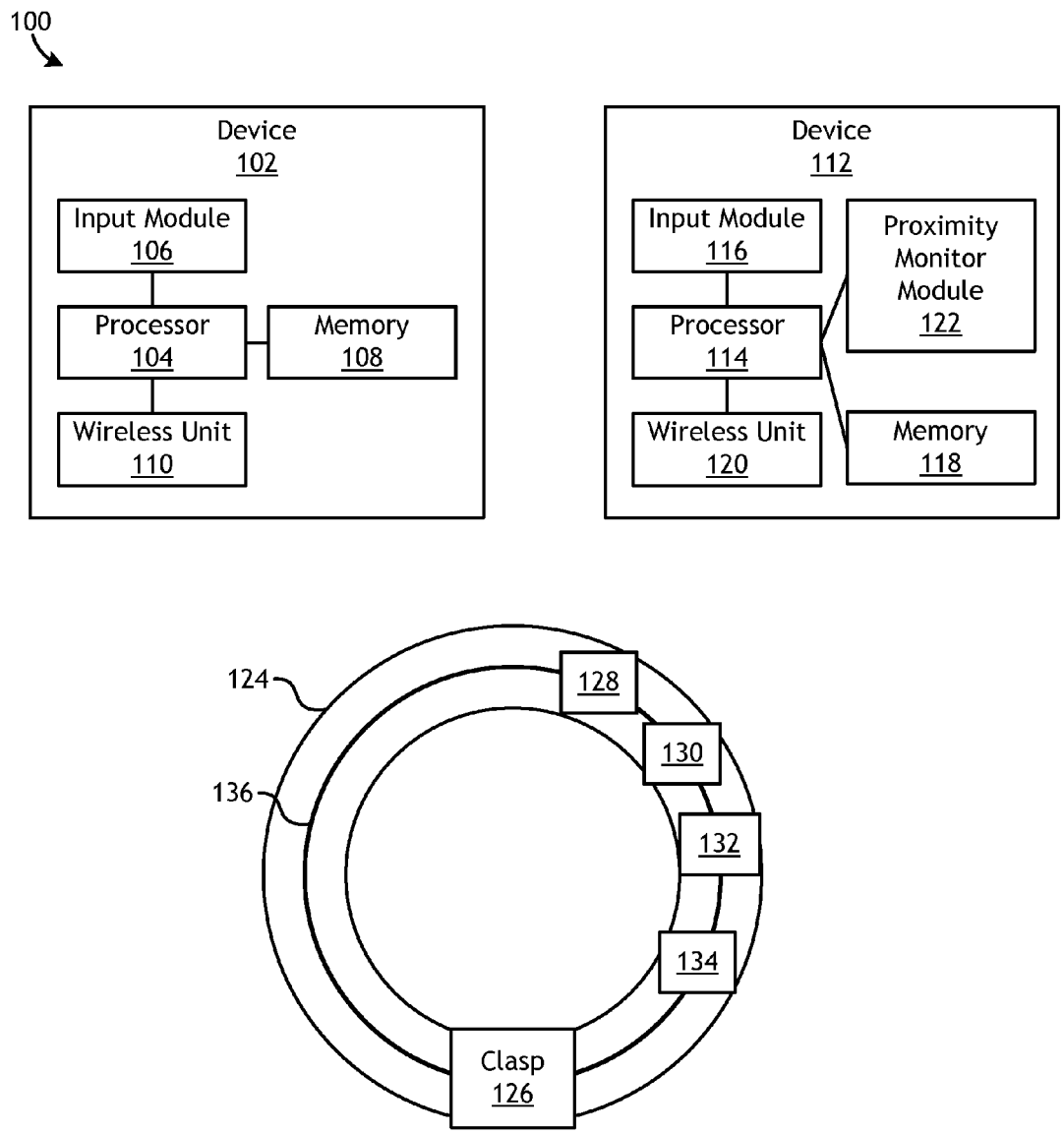
FIG. 1 is a schematic block diagram illustrating one embodiment of a system for automatically unlocking an electronic device via a wearable device.

Embodiments of methods and systems for automatically unlocking an electronic device via a wearable device are described. In an embodiment, a wearable device having minimal embedded electronic hardware uses a two-factor user authentication system while also monitoring the status of a clasp on the wearable device to determine whether the user still has the wearable device on their body.

In one embodiment a wearable device includes an energy efficient wireless module, such as a Bluetooth Low Energy (LE) module, and a processor capable of monitoring the status of a clasp on the wearable device. When a user puts on the wearable device and closes the clasp, the wearable device wirelessly triggers an up-front user authentication process with a nearby information handling system, such as a computer or mobile phone. The user enters an initial authentication password, and the information handling system sends a rolling One-Time Password (OTP) to the wearable device for future use with one or more information handling systems. As long as the user keeps wearing the wearable device, the wearable device acts as a universal proxy for that user by helping to automatically unlock one or more information handling systems that the wearable device may come within a pre-defined range of. Each time the user comes within a predefined range of an information handling system and presses a button on the information handling system, the wearable device sends the next OTP from a rolling series of passwords to the information handling system, thereby automatically unlocking the information handling system for the user. If the user retreats beyond the predefined distance (i.e., moves out of range) of the information handling system then the information handling system locks automatically. If the user opens the clasp and thereby removes the wearable device then the wearable device resets itself and stops acting as a universal proxy for the user until the user re-authenticates. If the first user removes the wearable device then a second user may put on the wearable device, close the clasp, and enter their individual user authentication credentials in order to begin using the wearable device as their own universal proxy.

In another embodiment, the wearable device may be used to control access to one or more browser-based applications of an information handling system, such as online shopping accounts, financial records, or medical records. In such an embodiment, the wearable device may provide automated security credentials, such as web page logins and/or payment authorizations. In one embodiment, the wearable device may also trigger a reminder alarm, such as a mobile phone ring tone, if the user of the wearable device accidentally leaves their mobile phone behind at a location (e.g., a coffee shop, or under a couch cushion in a living room). In various embodiments an authenticated wearable device may be used to control access to a variety of electronic devices including, but not limited to, mobile phones, tablets, laptop computers, desktop computers, servers, building security doors, garage doors, smart thermostats, or Bluetooth-enabled electronic padlocks.

The present invention thus enables a wearable device having minimal electronic hardware to automatically unlock one or more information handling systems on behalf of a user based on a rolling OTP protocol and an efficient Bluetooth LE wireless module. Since the system only requires the user to manually enter an initial authentication password once when first putting on the wearable device, the user can utilize a longer and/or more complex password to achieve a high level of security without the inconvenience of repetitive manual password entry. After the up-front manual authentication, the wearable device uses a rolling OTP generation scheme to automatically provide the second factor of the two-factor authentication, thereby providing both convenience and security to the user. Since the initial user authentication is performed by an information handling system, a costly and power hungry integrated biometric sensor is not required in the wearable device itself. The inclusion of a standard wireless module, such as Bluetooth LE, also helps to minimize power consumption and Bill of Materials (BOM) cost. The wearable device may thus include efficient low cost components with a long battery life, thereby enabling the user to wear the device for an extended period between charges and to conveniently access multiple systems or applications with minimal manual re-authentications.

For the purposes of this disclosure, a OTP security scheme may include the Request for Comments (RFC) 2289 internet standard password system, the RFC 4226 Hashed Message Authentication Code (HMAC) standard, and/or the RFC 6238 time-based OTP algorithm. In another embodiment the wearable device may utilize an authentication layer such as "OpenID Connect" as a second factor for automated authentication after the initial manual authentication.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a schematic circuit diagram illustrating one embodiment of a system 100 for automatically unlocking an electronic device via a wearable device. In one embodiment, system 100 may include a first device 102. The first device 102 may include a processor 104, an input module 106, a memory 108, and a wireless unit 110. In various embodiments input module 106 may be a keyboard, touch screen, mouse, biometric sensor, or the like. In one embodiment wireless unit 110 may be an industry standard wireless module, such as a Bluetooth LE module or the like. In another embodiment wireless unit 110 may be configured to sense a physical proximity of wearable device 124. In one embodiment system 100 may include a second device 112. The second device may include a processor 114, an input module 116, a memory 118, and a wireless unit 120, such as a Bluetooth LE module. In various embodiments input module 116 may be a keyboard, touch screen, mouse, biometric sensor, or the like. The second device 112 may also include a proximity monitor module 122 configured to sense a physical proximity of wearable device 124.

In an embodiment, wearable device 124 may include a clasp 126 configured to enable a user of wearable device 124 to put on or remove wearable device 124 when clasp 126 is in an open state. If a user of wearable device 124 puts on wearable device 124, by placing the wearable device around a wrist, ankle, neck, waist, or other location where the wearable device may not be accidentally removed and closes clasp 126, then wearable device 124 will physically remain on the user's person until the user opens clasp 126 and removes wearable device 124. In one embodiment wearable device 124 may also include a battery unit 128, a processor 130, a wireless module 132, a memory 134, and one or more clasp sense wire(s) 136. In an embodiment, wireless module 132 may be a Bluetooth LE module.

In one embodiment processor 130 may be configured to use one or more clasp sense wire(s) 136 to continuously monitor whether clasp 126 is in an "open" state or a "closed" state. In an embodiment, memory 134 may be configured to store one or more values corresponding to a rolling OTP. In another embodiment, the functions of processor 130, wireless module 132, and/or memory 134 may be combined into a single energy efficient module integrated in wearable device 124. In various embodiments battery unit 128 may include a removable (e.g., disposable) battery or a rechargeable battery.

Figure 2:
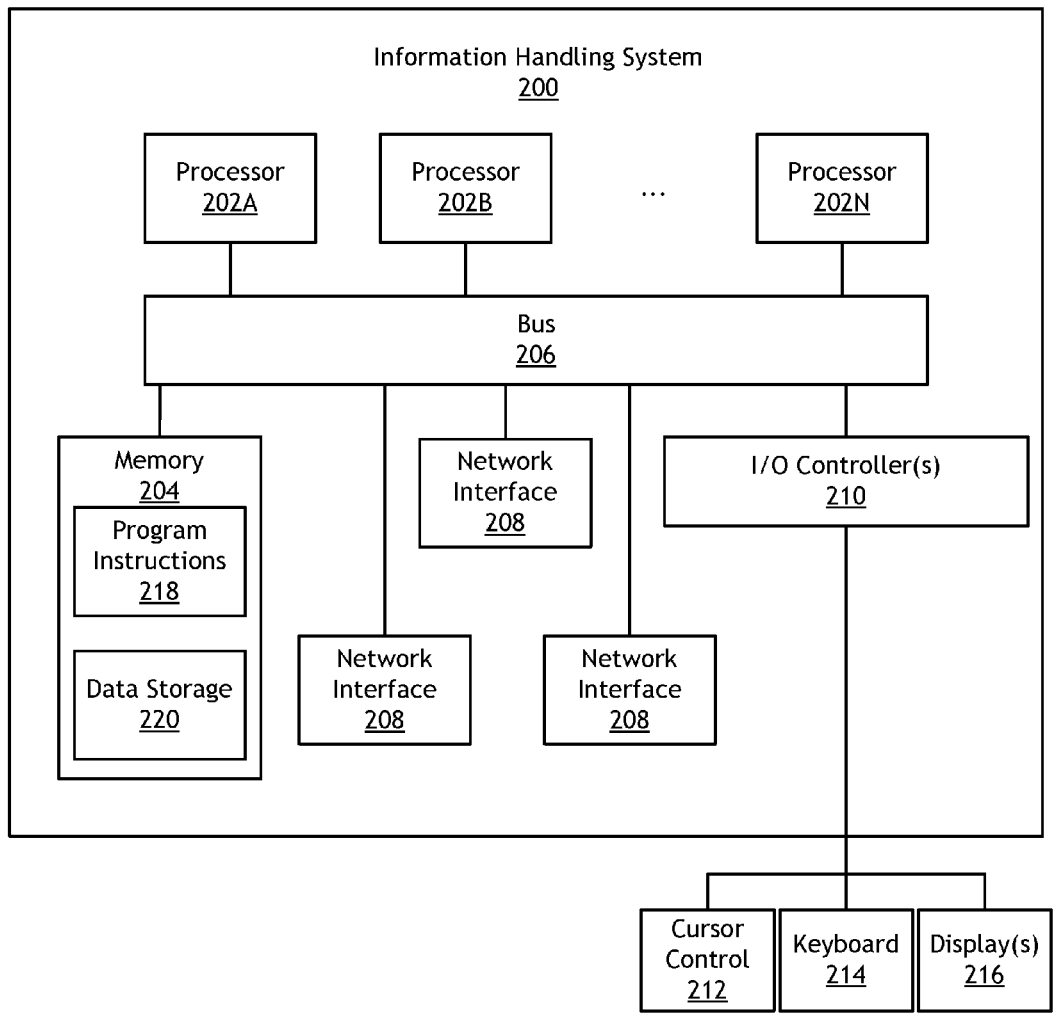
FIG. 2 is a schematic block diagram illustrating one embodiment of an Information Handling System (IHS) configured for automatically unlocking an electronic device via a wearable device.

FIG. 2 is a schematic block diagram illustrating one embodiment of an Information Handling System (IHS) 200 configured for automatically unlocking an electronic device via a wearable device. In one embodiment, device 102 may be implemented on an information handling system similar to IHS 200 described in FIG. 2. Similarly, device 112 may be implemented on an information handling system similar to IHS 200 described in FIG. 2. In various embodiments, IHS 200 may be a server, a mainframe computer system, a workstation, a network computer, a desktop computer, a laptop, or the like.

As illustrated, IHS 200 includes one or more processors 202A-N coupled to a system memory 204 via bus 206. IHS 200 further includes network interface 208 coupled to bus 206, and input/output (I/O) controller(s) 210, coupled to devices such as cursor control device 212, keyboard 214, and display(s) 216. In some embodiments, a given entity (e.g., device 102 and/or device 112) may be implemented using a single instance of IHS 200, while in other embodiments multiple such information handling systems, or multiple nodes making up IHS 200, may be configured to host different portions or instances of embodiments (e.g., device 102 and/or device 112). In one embodiment IHS 200 may include a Bluetooth Low Energy (LE) module 222, which may also be referred to as a "Bluetooth Smart" module, coupled to bus 206. Similarly, in an embodiment IHS 200 may include a proximity monitor module 224 coupled to bus 206. Bluetooth LE module 222 and proximity monitor module 224 may perform functions of embodiments illustrated in FIG. 1, FIG. 3, FIG. 4, FIG. 5, FIG. 6, and/or FIG. 7.

In various embodiments, IHS 200 may be a single-processor information handling system including one processor 202A, or a multi-processor information handling system including two or more processors 202A-N (e.g., two, four, eight, or another suitable number). Processor(s) 202A-N may be any processor capable of executing program instructions. For example, in various embodiments, processor(s) 202A-N may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processor(s) 202A-N may commonly, but not necessarily, implement the same ISA. Also, in some embodiments, at least one processor(s) 202A-N may be a graphics processing unit (GPU) or other dedicated graphics-rendering device.

System memory 204 may be configured to store program instructions and/or data accessible by processor(s) 202A-N. For example, memory 204 may be used to store software program and/or database shown in FIG. 3 and FIG. 4. In various embodiments, system memory 204 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described above, may be stored within system memory 204 as program instructions 218 and data storage 220, respectively. In other embodiments, program instructions and/or data may be received, sent or stored upon different types of IHS-accessible media or on similar media separate from system memory 204 or IHS 200. Generally speaking, a IHS-accessible medium may include any tangible, non-transitory storage media or memory media such as electronic, magnetic, or optical media—e.g., disk or CD/DVD-ROM coupled to IHS 200 via bus 206, or nonvolatile memory storage (e.g., "flash" memory)

The terms "tangible" and "non-transitory," as used herein, are intended to describe an IHS-readable storage medium (or "memory") excluding propagating electromagnetic signals, but are not intended to otherwise limit the type of physical IHS-readable storage device that is encompassed by the phrase IHS-readable medium or memory. For instance, the terms "non-transitory IHS readable medium" or "tangible memory" are intended to encompass types of storage devices that do not necessarily store information permanently, including for example, random access memory (RAM). Program instructions and data stored on a tangible IHS-accessible storage medium in non-transitory form may further be transmitted by transmission media or signals such as electrical, electromagnetic, or digital signals, which may be conveyed via a communication medium such as a network and/or a wireless link.

In an embodiment, bus 206 may be configured to coordinate I/O traffic between processor 202, system memory 204, and any peripheral devices including network interface 208 or other peripheral interfaces, connected via I/O controller(s) 210. In some embodiments, bus 206 may perform any necessary protocol, timing or other data transformations to convert data signals from one component (e.g., system memory 204) into a format suitable for use by another component (e.g., processor(s) 202A-N). In some embodiments, bus 206 may include support for devices attached through various types of peripheral buses, such as a variant of the Peripheral Component Interconnect (PCI) bus standard or the Universal Serial Bus (USB) standard, for example. In some embodiments, the operations of bus 206 may be split into two or more separate components, such as a north bridge and a south bridge, for example. In addition, in some embodiments some or all of the operations of bus 206, such as an interface to system memory 204, may be incorporated directly into processor(s) 202A-N.

Network interface 208 may be configured to allow data to be exchanged between IHS 200 and other devices, such as other information handling systems attached to device 102 and/or device 112, for example. In various embodiments, network interface 208 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

I/O controller(s) 210 may, in some embodiments, enable connection to one or more display terminals, keyboards, keypads, touch screens, scanning devices, voice or optical recognition devices, or any other devices suitable for entering or retrieving data by one or more IHS 200. Multiple input/output devices may be present in IHS 200 or may be distributed on various nodes of IHS 200. In some embodiments, similar I/O devices may be separate from IHS 200 and may interact with IHS 200 through a wired or wireless connection, such as over network interface 208.

As shown in FIG. 2, memory 204 may include program instructions 218, configured to implement certain embodiments described herein, and data storage 220, comprising various data accessible by program instructions 218. In an embodiment, program instructions 218 may include software elements of embodiments illustrated in FIG. 3 and FIG. 4. For example, program instructions 218 may be implemented in various embodiments using any desired programming language, scripting language, or combination of programming languages and/or scripting languages. Data storage 220 may include data that may be used in these embodiments such as, for example, device 102, device 112, and/or wearable device 124. In other embodiments, other or different software elements and data may be included.

A person of ordinary skill in the art will appreciate that IHS 200 is merely illustrative and is not intended to limit the scope of the disclosure described herein. In particular, the information handling system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other information handling system configurations.

Figure 3:
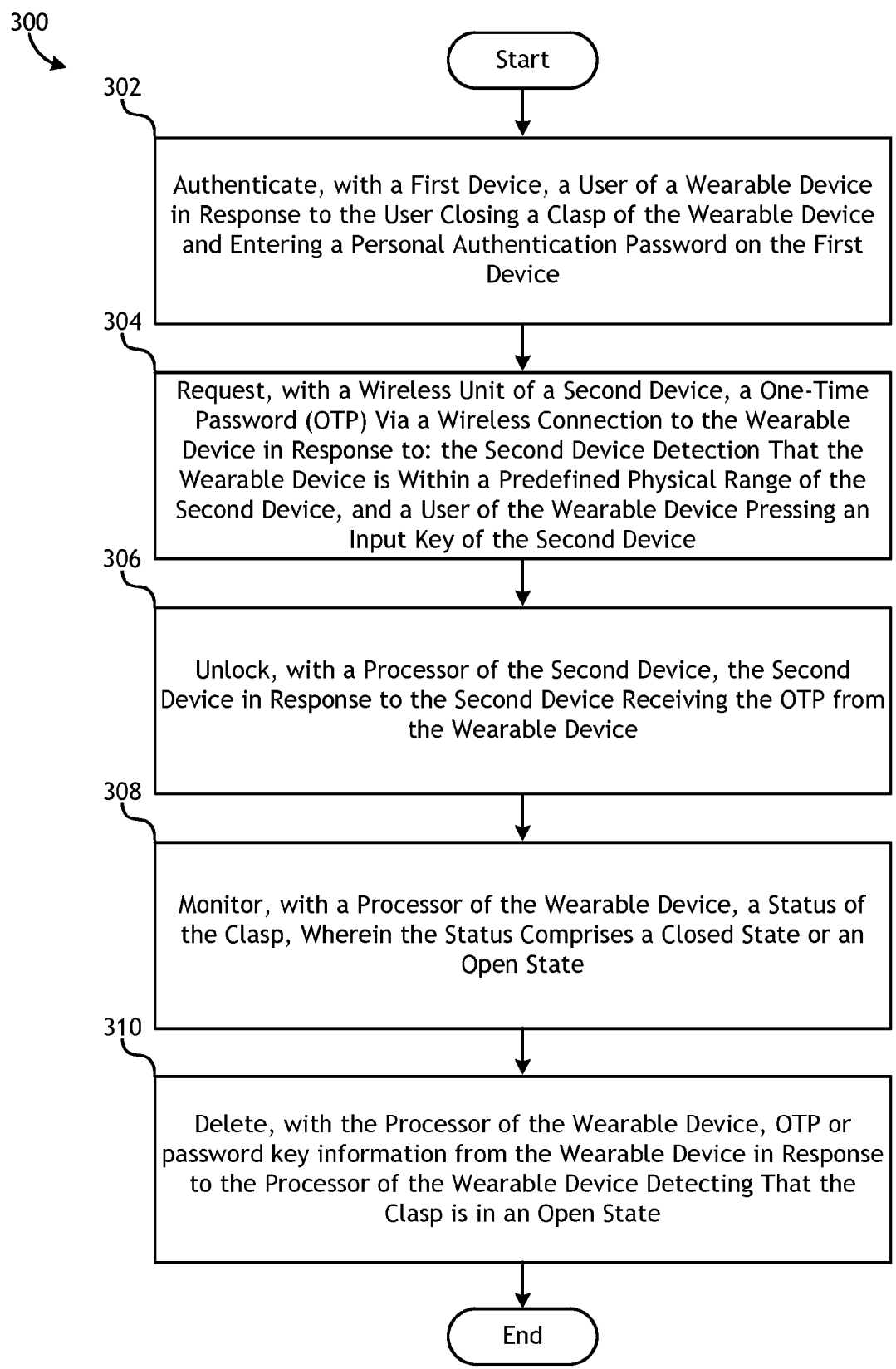
FIG. 3 is a schematic flowchart diagram illustrating one embodiment of a method for automatically unlocking an electronic device via a wearable device.
Figure 4:
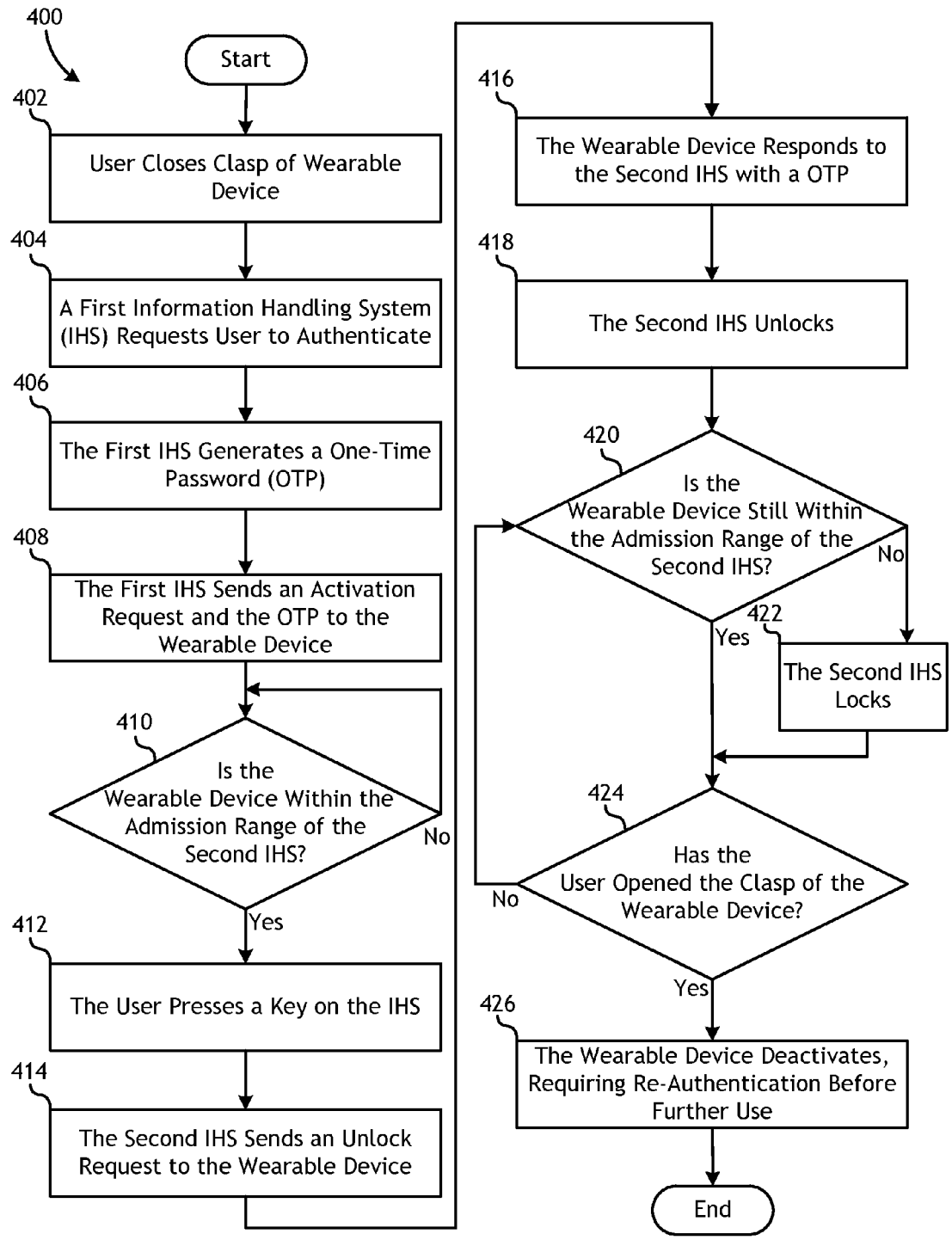
FIG. 4 is a schematic flowchart diagram illustrating one embodiment of a method for automatically unlocking an electronic device via a wearable device.
Figure 6:
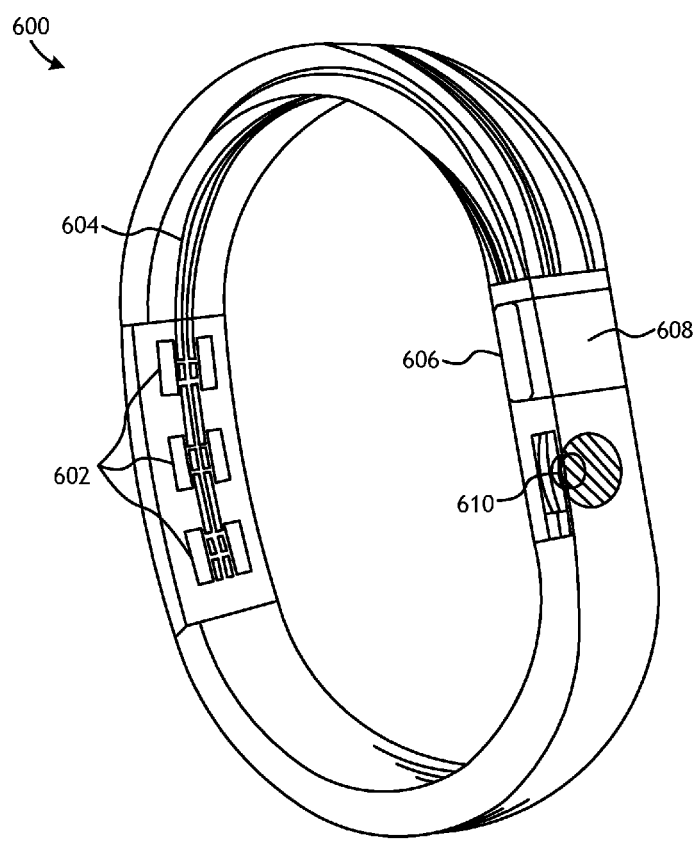
FIG. 6 is a schematic block diagram illustrating one embodiment of an apparatus for automatically unlocking an electronic device via a wearable device.
Figure 7:
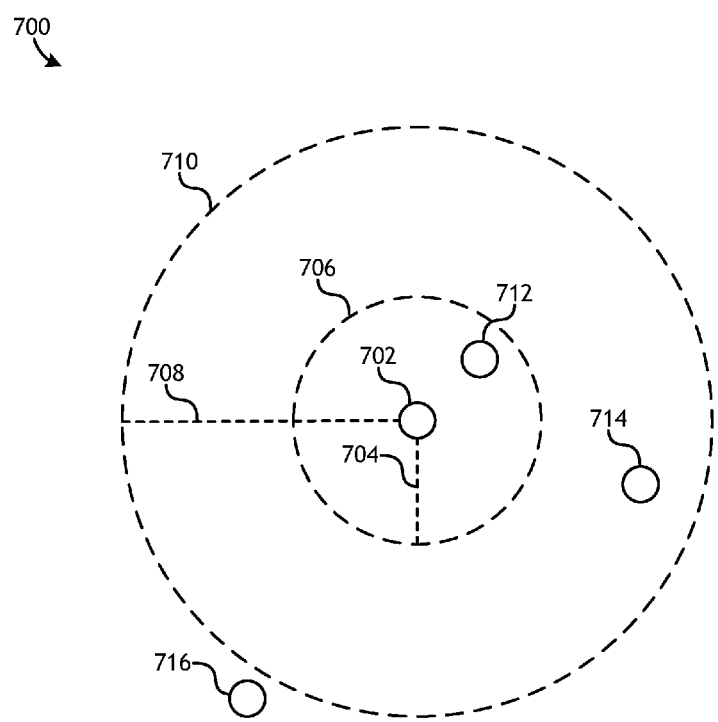
FIG. 7 is a schematic block diagram illustrating one embodiment of a system for automatically unlocking an electronic device via a wearable device.

Embodiments of device 102 and/or device 112 described in FIG. 1, FIG. 3, FIG. 4, and/or FIG. 7 may be implemented in an information handling system that is similar to IHS 200. In one embodiment, the elements described in FIG. 1, FIG. 3, FIG. 4, FIG. 5, FIG. 6, and/or FIG. 7 may be implemented in discrete hardware modules. Alternatively, the elements may be implemented in software-defined modules which are executable by one or more of processors 202A-N, for example.

FIG. 3 is a schematic flowchart diagram illustrating one embodiment of a method 300 for automatically unlocking an electronic device via a wearable device. At block 302, the method 300 includes authenticating, with a first device, a user of a wearable device in response to the user closing a clasp of the wearable device and entering a personal authentication password on the first device. In one embodiment the first device may be an information handling system. In an embodiment the authentication may also include the user providing biometric authentication credentials, such as a fingerprint or retinal scan to the first device. As depicted in block 304, the method 300 includes requesting, with a wireless unit of a second device, a One-Time Password (OTP) via a wireless connection to the wearable device in response to: the second device detecting that the wearable device is within a predefined physical range of the second device, and a user of the wearable device pressing an input key of the second device. In one embodiment the second device may be an information handling system. In various embodiments the input key may be a "home" key on a mobile phone, or any key on the keyboard of an IHS.

As shown in block 306, the method 300 includes unlocking, with a processor of the second device, the second device in response to the second device receiving the OTP from the wearable device. In an embodiment the second device may receive the OTP from the wearable device via an industry standard wireless connection, such as a Bluetooth LE connection. In an embodiment, the OTP may be based on a rolling password scheme, such as a security scheme where the OTP may change every 30 (thirty) seconds. In another embodiment a password manager on an IHS may store primary security credentials, such as a username and password associated with the user of the wearable device. In one embodiment the OTP series may be stored on a cloud-based internet backend for security management situations involving browser-based applications.

As depicted in block 308, the method 300 includes monitoring, with a processor of the wearable device, a status of the clasp, wherein the status includes a closed state or an open state. At block 310 the method 300 includes deleting, with the processor of the wearable device, OTP or password key information from the wearable device in response to the processor of the wearable device detecting that the clasp is in an open state. In one embodiment, deleting OTP or password key information from the wearable device (i.e., de-provisioning the wearable device) may include resetting the wearable device to an initial un-authenticated status, deleting all OTP password information from the wearable device, and/or deleting all password key information from the wearable device. In such an embodiment, the processor of the wearable device would remove all of the password data required to respond to OTP requests (i.e., the wearable device would lose the ability to respond to any password authentication requests) unless a future user who put on the wearable device and closed the clasp subsequently entered their individual authentication credentials, such as a password, into an IHS in order to re-provision (i.e., re-authenticate) the wearable device. In another embodiment, the second device may lock in response to a user of the wearable device moving the wearable device beyond a predefined acceptance range of the second device. In an embodiment, the second device may lock in response to the processor of the wearable device detecting that a user of the wearable device has opened the clasp of the wearable device, and the second device detecting that the wearable device has been de-provisioned due to the clasp being in an open state.

FIG. 4 is a schematic flowchart diagram illustrating one embodiment of a method 400 for automatically unlocking an electronic device via a wearable device. In one embodiment, the method 400 may include a user putting on a wearable device and closing the clasp of the wearable device, as shown in block 402. As depicted in block 404, a first IHS requests the user to authenticate. In various embodiments the initial user authentication may include entering a password on the IHS and/or providing biometric identification credentials to the IHS via a user input device coupled to the IHS. As shown in block 406 the first IHS generates a OTP. At block 408 the first IHS sends an activation request and also the OTP to the wearable device.

As depicted in block 410, the method 400 includes a second IHS using a proximity monitor module or wireless sensor to determine whether the wearable device is within range of the second IHS. If the wearable device is not within range of the second IHS, then the second IHS continues to monitor for the wearable device. If the wearable device is within range of the second IHS, the user presses a key on the second IHS, as shown in block 412. At block 414 the second IHS sends an unlock request to the wearable device. As depicted in block 416 the wearable device responds to the second IHS with a current OTP. As shown in block 418 the second IHS unlocks.

At block 420 the method 400 includes a processor of the second IHS determining if the wearable device is still within the predefined admission range of the second IHS. If the wearable device is not within the predefined admission range then the second IHS locks, as shown in block 422. In an embodiment, the predefined admission range may correspond to an inner zone. An outer zone may include a second physical range including distances greater than the inner zone and less than a maximum transmission distance of a wireless unit of the wearable device. The processor of the second IHS may be configured to calculate a position of the wearable device relative to the inner zone and the outer zone in response to the processor of the second IHS measuring a wireless signal strength (e.g., a Bluetooth signal strength) of a signal received from the wearable device.

If the wearable device is within the admission range of the second IHS, then the processor of the wearable device determines whether a user has opened the clasp of the wearable device, as depicted in block 424. If the user has not opened the clasp the process returns to block 420. If the user has opened the clasp the wearable device deactivates, such that re-authentication will be required before future use, as shown in block 426. In an embodiment, deactivating (i.e., de-provisioning) the wearable device may include deleting all OTP password information from the wearable device, and/or deleting all password key information from the wearable device.

Figure 5:
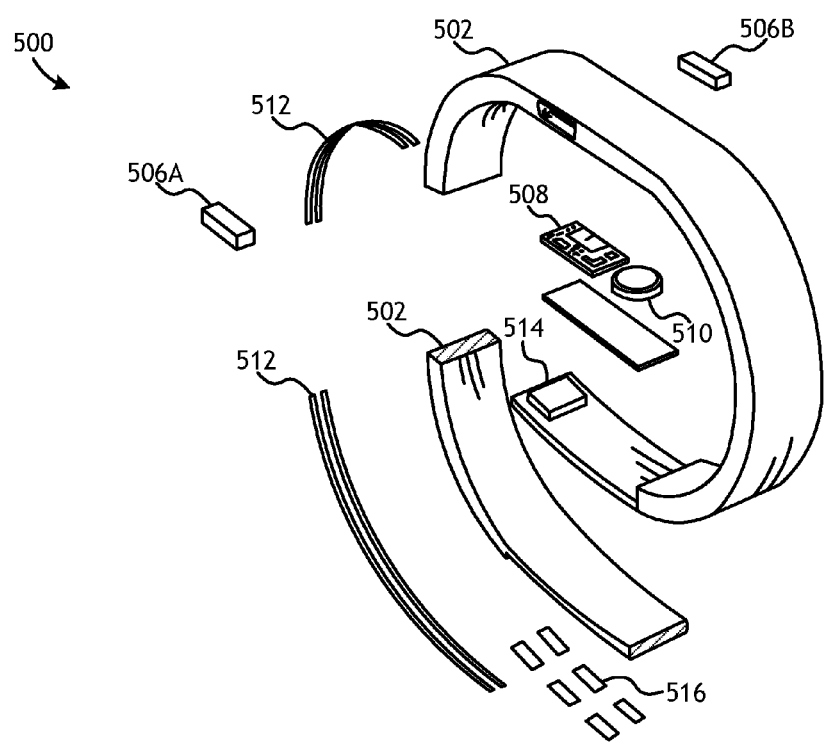
FIG. 5 is a schematic block diagram illustrating one embodiment of an apparatus for automatically unlocking an electronic device via a wearable device.

FIG. 5 is a schematic block diagram illustrating one embodiment of an apparatus 500 for automatically unlocking an electronic device via a wearable device. In one embodiment the apparatus 500 may include a coating 502, a label 504, one or more buttons 506A-B, a Bluetooth LE module 508, a battery 510, one or more clasp sense wires 512, a magnet 514, and multiple metal size-adjustment plates 516. In an embodiment label 504 may include a customized design and/or color. In various embodiments battery 510 may be a removable disposable battery or an integrated rechargeable battery.

In one embodiment, buttons 506A-B may be pressed to open or close a clasp mechanism. The clasp mechanism may be adjusted by the position of magnet 514 with respect to multiple metal size-adjustment plates 516. For example, pressing buttons 506A-B may trigger a signal along one of clasp sense wires 512 that allows magnet 514 to move from a first position with respect to metal size-adjustment plates 516 to a second position with respect to metal size-adjustment plates 516, thereby effectively increasing or decreasing the diameter of apparatus 500 to enable a user to remove or put on, respectively, the wearable device. In another embodiment a user may manually temporarily detach magnet 514 from one or more of metal size-adjustment plates 516, thereby opening the clasp of the wearable device. In one embodiment, pressing buttons 506A-B may trigger a processor, such as Bluetooth LE module 508, to register that the clasp of the wearable device has changed from a closed state to an open state or from an open state to a closed state. In another embodiment, a processor may use clasp sense wires 512 to detect a change in the status of the clasp mechanism in response to a user manually detaching magnet 514 from one or more of metal size-adjustment plates 516. In yet another embodiment, buttons 506A-B may perform other electronic functions associated with Bluetooth LE module 508 and/or a processor coupled to Bluetooth LE module 508.

FIG. 6 is a schematic block diagram illustrating one embodiment of an apparatus 600 for automatically unlocking an electronic device via a wearable device. In one embodiment the apparatus 600 may include a clasp mechanism having multiple clasp size positions 602. The clasp mechanism may be communicatively connected to a processor, such as Bluetooth LE module 608 by one or more clasp sense wires 604. In an embodiment apparatus 600 may also include a button 606, a battery power module 610, and a label 612. In various embodiments, pressing button 606 and/or changing the position of the clasp mechanism between the multiple clasp positions 602 may trigger a processor, such as Bluetooth LE module 608, to register that the status of the clasp has changed from an open state to a closed state or from a closed state to an open state. In another embodiment, label 612 may be customizable based on user preferences.

FIG. 7 is a schematic block diagram illustrating one embodiment of a system 700 for automatically unlocking an electronic device via a wearable device. In one embodiment the system 700 may include a first IHS 702. The first IHS 702 may include a processor, such as a proximity monitor module or a Bluetooth LE module, configured to wirelessly detect a position of a wearable device with respect to the first IHS 702. In an embodiment, a first radius 704 may be set to equal a pre-defined admission range 706 corresponding to a maximum distance at which an authenticated wearable device will be considered to be within range for the purposes of unlocking IHS 702. Similarly, a second radius 708 may define a detection range 710 corresponding to a maximum range at which IHS 702 may be able to wirelessly detect a wearable device. In an embodiment, predefined admission range 706 may correspond to an inner zone. An outer zone may include a second physical range including distances between pre-defined admission range 706 and second radius 708. The outer zone may thus include distances greater than pre-defined admission range 706 and less than detection range 710. The processor of IHS 702 may be configured to calculate a position of the wearable device relative to the inner zone and the outer zone in response to the processor of IHS 702 measuring a wireless signal strength (e.g., a Bluetooth signal strength) of a signal received from the wearable device.

For example, if an authenticated wearable device is located at position 712, then the authenticated wearable device will be considered to be within the admission range 706, thereby initiating the unlocking process for IHS 702 as long as the clasp of the authenticated wearable device remains closed and/or the wearable device does not move beyond the admission range 706. If the authenticated wearable device moves to position 714, the IHS 702 locks itself since the wearable device is outside the admission range 706. If a wearable device, regardless of its authentication status, is located at position 716, then the IHS 702 cannot detect or communicate with the wearable device because the wearable device is outside the detection range 710 of the IHS 702. If the wearable device is located at position 716 (i.e., beyond the detection range 710 of IHS 702) then IHS 702 may lock itself.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below.

Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method of automatically unlocking an electronic device via a wearable device, comprising:
   authenticating, with a first device, a user of the wearable device in response to the user closing a clasp of the wearable device and entering a personal authentication password on the first device;
   requesting, with a wireless unit of a second device, a rolling one-time password (OTP) from a series of passwords via a wireless connection to the wearable device in response to:
      the second device detecting that the wearable device is within a predefined physical range of the second device; and
      the user of the wearable device pressing an input key of the second device;
   unlocking, with a processor of the second device, the second device in response to the second device receiving the rolling OTP from the wearable device;
   monitoring, with a processor of the wearable device, a status of the clasp, wherein the status comprises a closed state or an open state;
   deleting, with the processor of the wearable device, OTP or password key information from the wearable device in response to the processor of the wearable device detecting that the clasp is in the open state;
   authorizing a web page login on a browser of the second device in response to:
      the second device detecting that the wearable device is within the predefined physical range of the second device; and
      a user of the wearable device navigating to the web page on the browser.

2. The method of claim 1, further comprising locking, with the processor of the second device, the second device in response to the second device detecting that the wearable device is outside the predefined physical range, wherein:
   the predefined physical range comprises an inner zone;

an outer zone comprise a second physical range comprising distances greater than the inner zone and less than maximum transmission distance of a wireless unit of the wearable device; and the processor of the second device is configured to calculate a position of the wearable device relative to the inner zone and the outer zone in response to the processor of the second device measuring a wireless signal strength of a signal received from the wearable device.

3. The method of claim 1, wherein the first device and the second device further comprise a plurality of information handling systems.

4. The method of claim 1, wherein authenticating the user further comprises the first device reading a fingerprint of the user.

5. The method of claim 1, wherein the wireless connection further comprises a Bluetooth Low Energy (LE) connection.

6. The method of claim 1, further comprising authorizing an online shopping payment in response to the user of the wearable device making a purchase with the browser.

7. A system for automatically unlocking an electronic device via a wearable device, comprising:
a processor of a first device configured to authenticate a user of the wearable device in response to the user closing a clasp of the wearable device and entering a personal authentication password on the first device;
a processor of a second device, controlling a wireless unit of the second device configured to request a rolling one-time password (OTP) from a series of passwords via a wireless connection to the wearable device in response to:
the second device detecting that the wearable device is within a predefined physical range of the second device; and
the user of the wearable device pressing an input key of the second device;
the processor of the second device configured to unlock the second device in response to the second device receiving the rolling OTP from the wearable device; and
a processor of the wearable device configured to:
monitor a status of the clasp, wherein the status comprises a closed state or an open state; and
delete OTP or password key information from the wearable device in response to the processor of the wearable device detecting that the clasp is in the open state;
wherein the processor of the second device is further configured to configured to authorize a web page login in a broswer in response to:
the second device detecting that the wearable device is within the predefined physical range of the second device; and
the user of the wearable device navigating to the web page on the browser.

8. The system of claim 7, wherein:
the processor of the second device locks the second device in response to the second device detecting that the wearable device is outside the predefined physical range;
the predefined physical range comprises an inner zone;
an outer zone comprises a second physical range comprising distances greater than the inner zone and less than a maximum transmission distance of a wireless unit of the wearable device; and the processor of the second device is configured to calculate a position of the wearable device relative to the inner zone and the outer zone in response to the processor of the second device measuring a wireless signal strength of a signal received from the wearable device.

9. The system of claim 7, wherein the first device and the second device further comprise a plurality of information handling systems.

10. The system claim 7, wherein the first device configured to authenticate the user further comprises a unit for reading a fingerprint of the user.

11. The system of claim 7, wherein the wireless connection further comprises a Bluetooth Low Energy (LE) connection.

12. The system of claim 7, wherein the browser is configured to authorize an online shopping payment in response to the user of the wearable device making a purchase with the browser.

13. An apparatus for automatically unlocking an electronic device via a wearable device, comprising:
a processor of a first device configured to authenticate a user of the wearable device in response to the user closing a clasp of the wearable device and entering a personal authentication password on the first device;
a processor of a second device, controlling a wireless unit of a second device configured to request a rolling one-time password (OTP) from a series of passwords via a wireless connection to the wearable device in response to:
the second device detecting that the wearable device is within a predefined physical range of the second device; and
the user of the wearable device pressing an input key of the second device;
the processor of the second device configured to unlock the second device in response to the second device receiving the rolling OTP from the wearable device; and
a processor of the wearable device configured to:
monitor a status of the clasp, wherein the status comprises a closed state or an open state; and
delete OTP or password key information from the wearable device in response to the processor of the wearable device detecting that the clasp is in the open state;
wherein the processor of the second device is further configured to authorize a web page login in a web browswer in response to:
the second device detecting that the wearable device is within the predefined physical range of the second device; and
the user of the wearable device navigating to the web page on the browser.

14. The apparatus of claim 13, wherein:
the processor of the second device locks the second device in response to the second device detecting that the wearable device is outside the predefined physical range;
the predefined physical range comprises an inner zone;
an outer zone comprises a second physical range comprising distances greater than the inner zone and less than a maximum transmission distance of a wireless unit of the wearable device; and
the processor of the second device is configured to calculate a position of the wearable device relative to the inner zone and the outer zone in response to the processor of the second device measuring a wireless signal strength of a signal received from the wearable device.

15. The apparatus of claim 13, wherein the first device and the second device further comprise a plurality of information handling systems.

16. The apparatus of claim 13, wherein the first device configured to authenticate the user further comprises a unit for reading a fingerprint of the user.

17. The apparatus of claim 13, wherein the wireless connection further comprises a Bluetooth Low Energy (LE) connection.

* * * * *